US008988354B2

(12) United States Patent
Milhe et al.

(10) Patent No.: US 8,988,354 B2
(45) Date of Patent: Mar. 24, 2015

(54) INPUT DEVICE FOR A DISPLAY

(75) Inventors: Richard Milhe, Divonne-les-Bains (FR); Tarak Fekih, Concise (CH); Alexis Richard, La-Tour-de-Peliz (CH); Sylvain Sauvage, La-Tour-de-Peliz (CH); Laurent Plancherel, Lausanne (CH); Pai-Cheng Chu, Yuanlin Township (TW); Eric Hsu, Zhubei (TW)

(73) Assignee: Logitech Europe S.A., Morges (CH)

( * ) Notice: Subject to any disclaimer, the term of this patent is extended or adjusted under 35 U.S.C. 154(b) by 0 days.

(21) Appl. No.: 13/449,220

(22) Filed: Apr. 17, 2012

(65) Prior Publication Data

US 2013/0271373 A1 Oct. 17, 2013

(51) Int. Cl.
*G06F 3/02* (2006.01)
*G06F 1/16* (2006.01)

(52) U.S. Cl.
USPC ............... 345/168; 345/169; 361/679.09

(58) Field of Classification Search
CPC .......... G06F 1/162; G06F 1/167; G06F 1/169
USPC .............. 345/156, 168–169, 173–174, 184; 361/679.08–679.09
See application file for complete search history.

(56) References Cited

U.S. PATENT DOCUMENTS

| | | | |
|---|---|---|---|
| 6,856,506 B2 | 2/2005 | Doherty et al. | |
| 2004/0114315 A1* | 6/2004 | Anlauff | 361/681 |
| 2004/0159762 A1 | 8/2004 | Ghosh | |
| 2004/0169995 A1* | 9/2004 | Ghosh et al. | 361/683 |
| 2006/0007645 A1* | 1/2006 | Chen et al. | 361/681 |
| 2008/0270665 A1* | 10/2008 | Senatori et al. | 710/303 |
| 2012/0044638 A1 | 2/2012 | Mongan et al. | |
| 2012/0140396 A1* | 6/2012 | Zeliff et al. | 361/679.09 |
| 2013/0076614 A1* | 3/2013 | Ive et al. | 345/156 |

FOREIGN PATENT DOCUMENTS

JP  2012-043182 A  3/2012

* cited by examiner

*Primary Examiner* — Lun-Yi Lao
*Assistant Examiner* — Jarurat Suteerawongsa
(74) *Attorney, Agent, or Firm* — Kilpatrick Townsend & Stockton LLP (57) ABSTRACT

Embodiments of the invention are directed to an input device comprising a processor configured to operate the input device in one of a plurality of modes of operation, a plurality of buttons, and a housing configured to receive and secure a display device. The housing is configurable in a plurality of positions relative to the plurality of buttons, where at least a portion of the plurality of buttons operates in one of the plurality of modes of operation based, at least in part, on a position of the plurality of positions of the housing relative to the plurality of buttons.

22 Claims, 6 Drawing Sheets

INPUT DEVICE FOR A DISPLAY

CROSS-REFERENCES TO RELATED APPLICATIONS

NOT APPLICABLE

BACKGROUND

Portability is one of the attractive features of using a tablet computer. A tablet computer may be smaller and lighter than a laptop with a larger screen size than a phone. However, the portability of the tablet introduces some disadvantages. For example, performing word processing on the screen-based keyboard may be cumbersome. Those wanting the word processing functionality of a laptop may choose to attach a physical keyboard to their tablet computer. Similarly, a tablet with a high resolution display invites a user to interact with media on the tablet, for example, playing a game. Those interested in game playing may choose to attach a game console to their tablet computer. The rich diversity of uses of the tablet may lead to a plethora of external devices that need to be ported along with the tablet computer, diminishing from the portability of the tablet.

BRIEF SUMMARY

Certain embodiments of the invention relate to an input device including a processor configured to operate the input device in one of a plurality of modes of operation, a plurality of buttons, and a housing configured to receive and secure a display device. The housing can be configurable in a plurality of positions relative to the plurality of buttons, where at least a portion of the plurality of buttons operates in one of the plurality of modes of operation based, at least in part, on a position of the plurality of positions of the housing relative to the plurality of buttons. The input device can further include one or more sensors coupled to the processor, the one or more sensors configured to detect the position of the plurality of positions of the housing. The plurality of buttons can operate in one of the plurality of modes of operation based, at least in part, on which of the one or more sensors detects the housing.

In some embodiments, the housing further includes a magnet disposed therein, where the one or more sensors are relays configured to actuate when in proximity to a magnetic field created by the magnet. The plurality of buttons can include a first section of buttons and a second section of buttons. In some cases, the plurality of modes of operation includes at least one of a first mode of operation, where each button of the plurality of buttons is operable to generate data in response to being pressed, and a second mode of operation, where each button of the first section of buttons is operable to generate data in response to being pressed, and where the second section of buttons is inoperable. In some embodiments, the plurality of modes of operation further includes a third mode of operation, where the first and second sections of buttons are inoperable. While operating in the first mode of operation, each button of the plurality of buttons can be operable to generate alphanumeric data. While operating in the second mode of operation, one or more buttons of the first section of buttons can be operable to generate a media control command.

In further embodiments, the input device can further include a key frame disposed below the plurality of buttons, the key frame including a top edge, a middle portion, and a bottom edge. The housing can include a top edge and a bottom edge and the plurality of buttons can include a first section of buttons and a second section of buttons. In some cases, the first section of buttons can include a top edge and a bottom edge, and the second set of buttons can include a top edge and a bottom edge. The plurality of positions may include at least two of a number of positions. The first position of the plurality of positions can include the bottom edge of the housing substantially aligned with and in proximity to the top edge of the key frame and the top edge of the second section of buttons. A second position of the plurality of positions can include the bottom edge of the housing substantially aligned with and in proximity to the bottom edge of the key frame and the bottom edge of the first section of buttons. A third position of the plurality of positions can include the bottom edge of the housing substantially aligned with and in proximity to the top edge of the first section of buttons, the bottom edge of the second section of buttons, and the middle section of the key frame. In some aspects of the invention, the plurality of positions can further include a fourth position, wherein the top edge of the housing is in proximity to the bottom edge of the key frame and the bottom edge of the first section of buttons.

In certain embodiments, each position of the plurality of positions can be held in an orientation comprising an angle between a surface of the plurality of buttons and a plane formed by the housing. In some cases, the housing held in the first position can be oriented at a first angle relative to the plurality of buttons, the housing held in the second position can be oriented at a second angle relative to the plurality of buttons, the second angle greater than the first angle, the housing held in the third position can be oriented at a third angle relative to the plurality of buttons, the third angle greater than the second angle, and the housing held in the fourth position can be substantially parallel to the plane formed by the housing. Some embodiments can include a power supply including at least one of a solar panel, batteries, rechargeable batteries configured to be recharged by the solar panel, or a universal serial bus (USB).

In some embodiments, the input device can be a folio configured to perform at least one of waking the display device from a sleep mode when the folio is opened and putting the display device in the sleep mode when the folio is closed. The plurality of keys can be a keyboard operable to be wirelessly coupled to the display device via at least one of a Bluetooth, infra-red (IR), optical, or Wi-Fi connection.

Certain embodiments of the invention can include a method of operating an input device, the method including receiving a housing in a position of a plurality of positions relative to a key frame disposed in the input device, the housing configured to receive and secure a display device, the key frame including a plurality of buttons thereon, selecting a mode of operation for the input device based on the position receiving the housing, and operating the input device in the selected mode of operation. The method can further include detecting in which position of the plurality of positions the housing is held, where the detecting can be performed by a plurality of sensors disposed on the key frame. In some cases, the sensors can be a relay and the method may further include detecting an actuation of one or more of the relays, and notifying the processor that the housing is in a position corresponding to the position the housing is held. In certain aspects, a portion of the housing can include a magnet, wherein the actuation of the relay is caused by a magnetic field of the magnet.

In response to receiving the housing in a first position, some embodiments may include selecting a first mode of operation for the plurality of buttons where each button of the plurality of buttons is operable to generate data in response to being pressed. In response to receiving the housing in a second position, some embodiments may include selecting a second mode of operation where a first portion of keys of the plurality of keys is configured to generate data in response to being pressed, and a second portion of keys is inoperable. In the second mode of operation, some embodiments can comprise generating a media control command for at least one key of the first portion of keys in response to the at least one key being pressed. In the third mode of operation, some embodiments can render the first portion and second portion of keys inoperable.

DETAILED DESCRIPTION

Certain embodiments of the invention are directed to a multi-purpose protective folio for a tablet computer including a wireless keyboard and various power saving features. In a closed position, the protective folio functions as a convenient carrying case for a tablet computer. When opened, the protective folio can automatically turn on the tablet computer via magnetic coupling. Similarly, the protective folio can automatically turn off the tablet computer when closed. In some embodiments, the protective folio includes a physical keyboard configured as a wireless input device for the tablet computer. The protective folio can further provide physical support to hold the tablet computer in various upright positions of varying angles with respect to the keyboard for convenient viewing. The keyboard can be configured to operate in different modes of operation based, in part, on the particular position of the tablet.

For example, in a first mode of operation, the tablet computer is configured to be seated in an upright position above a top row of keys on the keyboard and inclined for an optimal viewing angle, according to an embodiment of the invention. In the first mode, the keyboard can be fully functional and can provide wireless alphanumeric input data to the tablet. In a second mode of operation, the tablet is supported in a second upright position over a portion of the keyboard and can provide various media control capabilities and power saving features, according to certain embodiments. For example, the tablet can be positioned above a bottom row of keys of the keyboard, where each key of the bottom row of keys can be configured to provide media control functions including play, fast forward, rewind, and the like. This configuration can be useful when full keyboard capability is not required. For instance, when watching movies, TV shows, or music videos on the tablet computer. The remainder of the keys (e.g., the second row through the top row of keys) can be rendered inoperable for reduced power consumption. In a third mode of operation, the tablet is seated in an upright position over the bottom row keys so as to substantially cover the entire keyboard and hold the tablet in an inclined position for an optimal viewing experience. The third mode can be selected when the user does not require a physical keyboard and simply wishes to configure the tablet computer in an upright position in an optimal viewing angle. In the third mode, the entire keyboard is rendered inoperable to provide a further reduced power consumption for the protective folio device. Some embodiments can include a solar panel to provide power to the protective folio system. While some of the novel aspects of the protective folio have been summarized above, it should be understood that they are non-limiting and many other embodiments and configurations are described and supported by this document. The summary has been included to provide the reader with a basic understanding of some of the novel concepts and technology described herein.

Figure 1A:
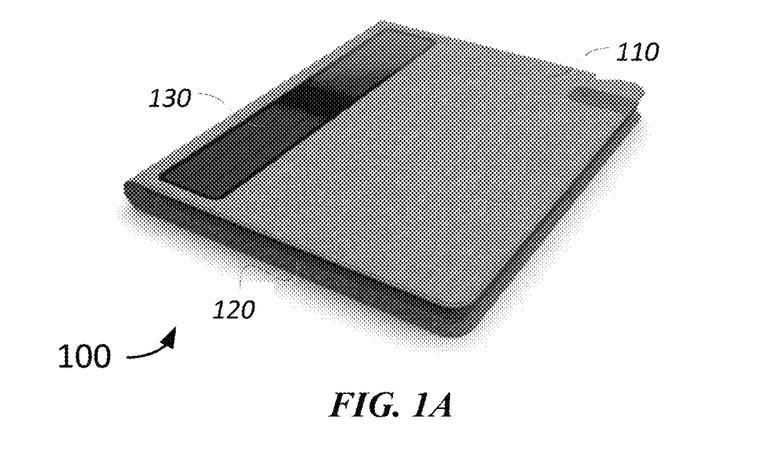
FIG. 1A illustrates a folio keyboard system in a closed configuration, according to an embodiment of the present invention.
Figure 1B:
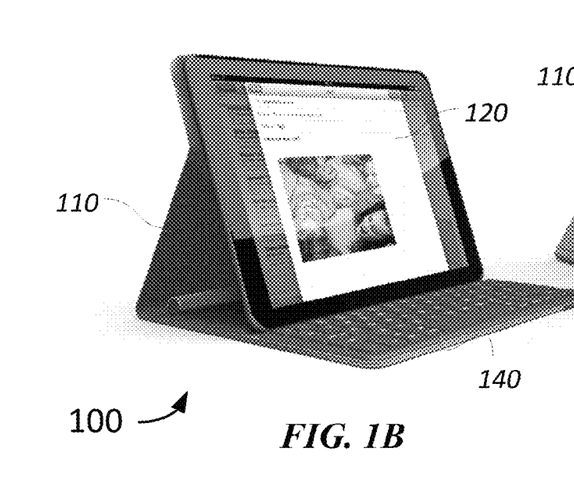
FIG. 1B illustrates a perspective view of the folio keyboard system in an open and operational configuration, according to an embodiment of the present invention.
Figure 1C:
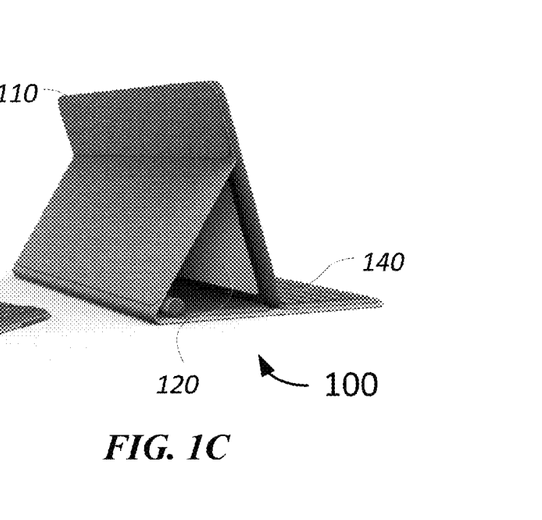
FIG. 1C illustrates a perspective view of the folio keyboard system in an open and operational configuration, according to an embodiment of the present invention.

FIG. 1A illustrates a folio keyboard system 100 in a closed configuration, according to an embodiment of the present invention. The folio keyboard system 100 depicts a closed-position folio 110 with a tablet computer 120 enclosed therein. Some embodiments can include a solar panel 130 to provide power to the system 100. FIGS. 1B and 1C illustrate perspective views of the folio keyboard system 100 in an open and operational configuration, according to an embodiment of the present invention. The folio keyboard 100 depicts the tablet computer 120 configured in an upright position above the top row of the keyboard 140 (i.e., first mode of operation) with rear held support provided by a portion of the folio 110 itself.

Figure 2:
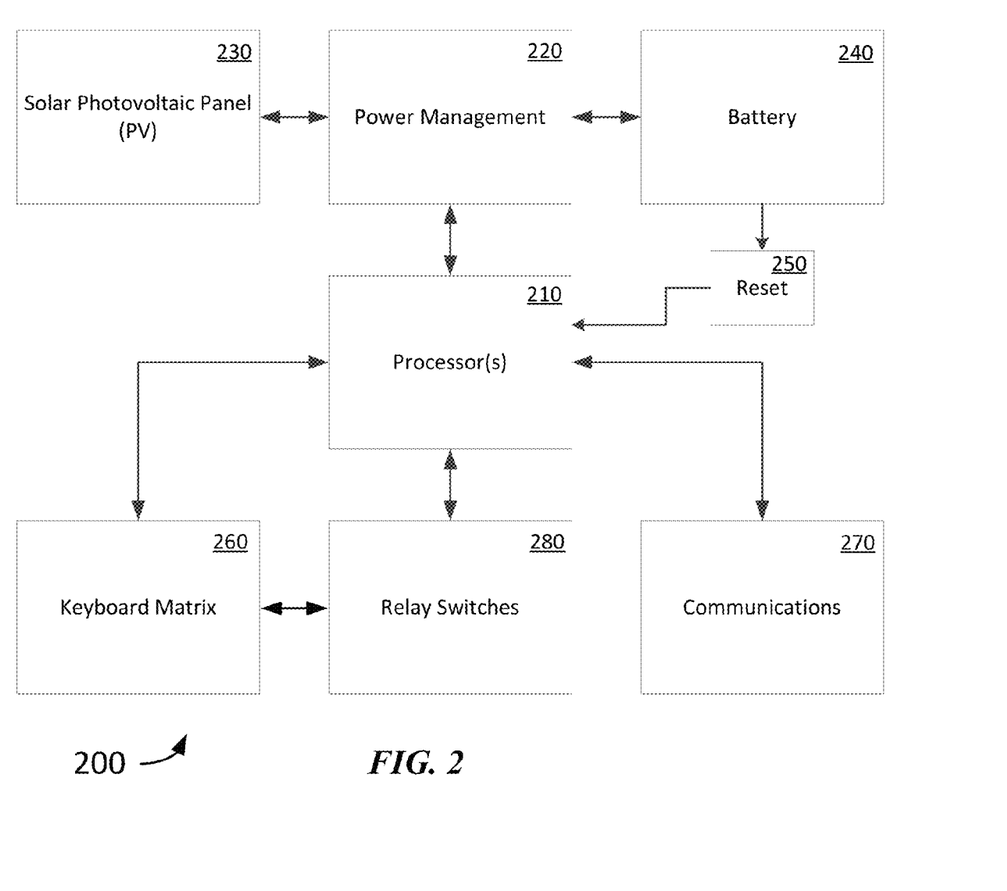
FIG. 2 is a simplified block diagram of a system configured to operate the folio keyboard system, according to an embodiment of the invention.

FIG. 2 is a simplified block diagram of a system 200 configured to operate the folio keyboard system 100, according to an embodiment of the invention. The system 200 includes a processor 210, a power management system 220, a photovoltaic element 230 (e.g., solar cell, solar panel), a power supply (e.g., batteries, rechargeable batteries, accumulator(s)) 240, a system reset switch 250, a keyboard matrix 260, a communications block 270, and relay switches 280. Each of the system blocks 220-270 are in electrical communication with the processor 210. System 300 may further include additional systems that are not shown or discussed to prevent obfuscation of the novel features described herein.

In certain embodiments, the processor 210 comprises one or more microprocessors (μCs) and is configured to control the operation of system 200. Alternatively, the processor 210 may include one or more microcontrollers (MCUs), digital signal processors (DSPs), or the like, with supporting hardware/firmware (e.g., memory, programmable I/Os, etc.), as would be appreciated by one of ordinary skill in the art. The processor 210 can be configured to operate the folio keyboard system (or more generally, an input device) in one of a number of modes of operation further described below with respect to FIG. 3.

In certain embodiments, the power management system 220 of system 200 is configured to manage power distribution, recharging, power efficiency, and the like, for the folio keyboard system 100. According to some embodiments, power management system 220 controls the power distribution by the batteries 240 and photovoltaic (PV) panel 230. The PV panel 230 can provide energy to the batteries (e.g., 2 AAA cells) when submitted to a light source. In some embodiments, the system reset switch 250 is configured to be in series with the processor 210 and power supply (e.g., batteries 240) to provide a system reset when activated (e.g., mechanical button, software activation, etc.). It should be noted that any number of management features may be used as required and would be appreciated by one of ordinary skill in the art.

The communications system 270 is configured to provide wireless communication between the folio keyboard system 100 and the tablet computer 110, according to an embodiment of the invention. In certain embodiments, the communications system 270 is controlled by the processor 210 and configured to provide radio-frequency (RF) communication with any of a wide variety of wireless communication protocols including, but not limited to, Bluetooth, WiFi and infra-red wireless systems. The folio keyboard system 100 may optionally comprise a hardwired connection to the tablet computer 110. For example, the system 100 may provide a Universal Serial Bus (USB) cable to provide electronic communication to the attached tablet computer or other external devices. Other embodiments of the invention may utilize different types of cables or connection protocol standards to effectuate a hardwired communication with outside entities. In one non-limiting example, a USB cable can be used to provide power to the folio keyboard system 100 to charge the batteries 240 and simultaneously support data communication between the system 200 and the tablet computer 110.

In some embodiments, the processor 210 integrates processing and RF communication functions, in addition to scanning and controlling the keyboard matrix 260, monitoring the relay switches 280, controlling LEDs (not shown) and the like. The keyboard matrix 260 includes a mechanical keyboard disposed in the folio 110. User inputs to the keyboard matrix can be wirelessly coupled to the tablet computer by way of the processor 210 and communication system 270. The keyboard 260 includes a key frame disposed therein (not shown) including a number of relay switches 280. The relay switches 280 can be activated by a tablet frame to determine when the keyboard is configured in the various modes of operation, as further described below with respect to FIG. 5. Alternatively, the keyboard matrix 260 may be configured in a non-conventional format (e.g., number pad, application-specific key arrangements, or other grouping of a number of buttons). The individual keys may be mechanical (e.g., scissor keys), soft keys on a display, or other suitable type of input interface.

Figure 3:
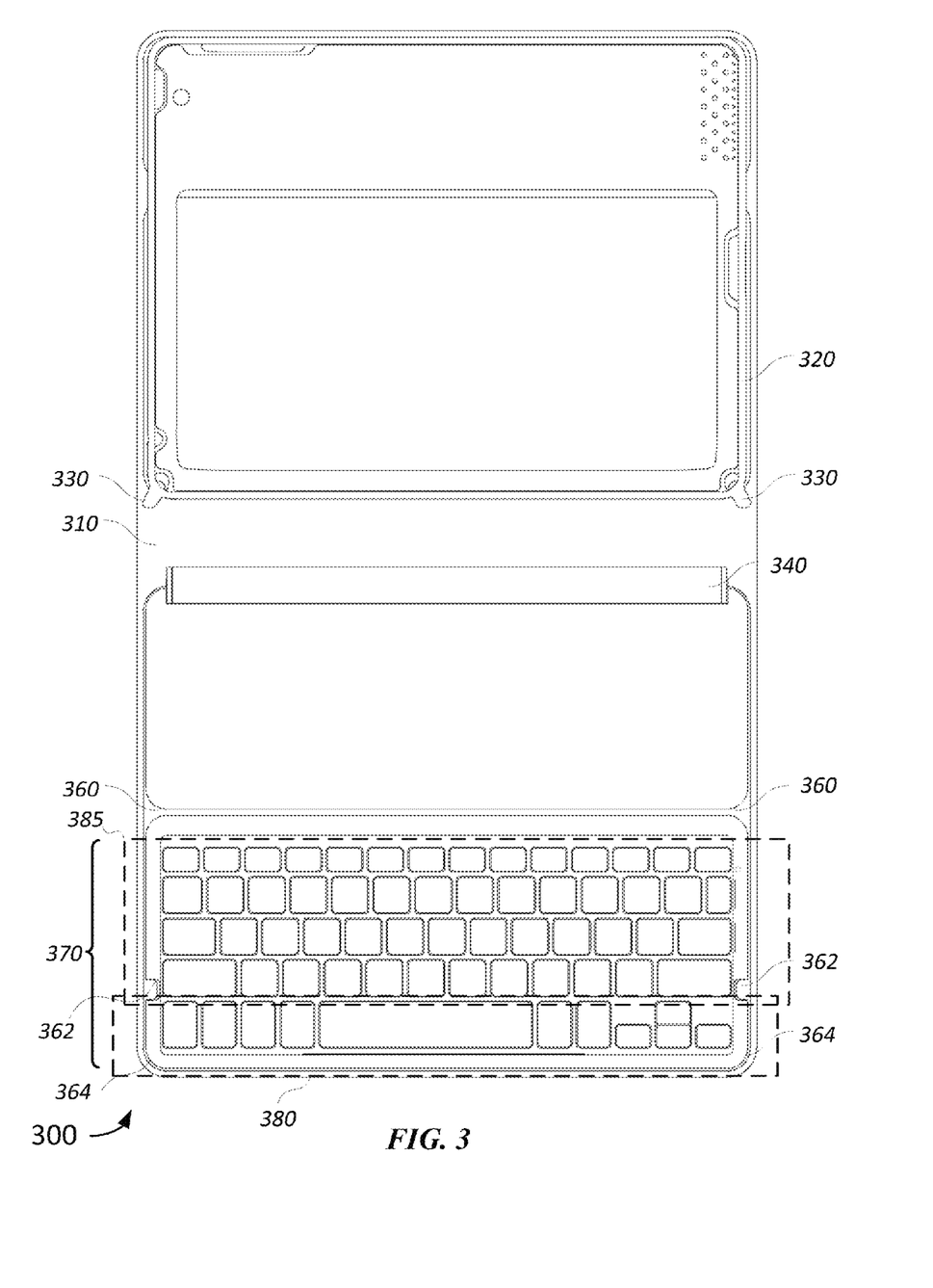
FIG. 3 illustrates a simplified diagram of a folio keyboard system, according to an embodiment of the invention.

FIG. 3 illustrates a simplified diagram of a folio keyboard system 300, according to an embodiment of the invention. The folio keyboard system 300 includes a protective folio 310, a tablet housing 320, battery housing 340, first keyboard docking sites (i.e. receiving sites) 360, second docking sites 362, third keyboard docking sites 364, and keyboard matrix 370. The tablet housing 320 includes placement tabs 330. The keyboard matrix 370 includes a first set of keys (e.g., the bottom-most row of keys) 380 and a second set of keys (e.g., all keys above the bottom-most row of keys) 385. In some embodiments, the folio keyboard system 300 can further include a solar panel (not shown). It should be noted that FIG. 3 depicts one non-limiting example of many possible keyboard configurations and relay switch placement locations, and alternative locations, configurations, and methods of detection can be used.

In certain embodiments, the folio 310 contains the keyboard matrix 370 and tablet computer and can fold over on itself like a book when placed in a closed configuration. The folio can be constructed from a variety of materials including, but not limited to, fabric, nylon, microfiber, leather, suede, or the like. The tablet housing 320 is configured to receive and secure a tablet computer (not shown). In some embodiments, the tablet computer can be snapped and secured into place within the tablet housing 320. The tablet housing 320 can optionally have a fastening means to secure the tablet.

According to some embodiments, the tablet housing 320 includes placement tabs 330. The placement tabs can be used to seat a portion of the tablet housing 320 in one of the first docking sites 360, second docking sites 362, or third docking sites 364. In some cases, the first docking sites 360 (i.e., receiving sites, positions) are located above the top most row of the keyboard matrix 370 (above the second set of keys 385) along the edges of the keyboard 370, as shown in FIG. 3. The second docking sites 364 (i.e., receiving sites, positions, etc.) can be located above the first row of keys (i.e., first set of keys 380) on the keyboard matrix 370 along the edges of the keyboard 370. The third docking sites 364 can be located below the bottom-most row (i.e., first set of keys 380) along the edges of the keyboard 370. Each of the docking sites can correspond to a first, second, or third mode of operation. For example, in some embodiments, when the tablet housing 320 is placed in the first docking site (i.e., first position), a first mode of operation is selected and the keyboard 370 is fully functional, where each key is configured to provide alphanumeric input data to the tablet computer. According to certain embodiments, when the tablet housing 320 is placed in the second docking site (i.e., second position), a second mode of operation is selected and the keyboard 370 is partially operational, where one or more of the first set of keys 380 can provide media control capabilities and the second set of keys 385 are rendered inoperable, which can conserve power. In further embodiments, when the tablet housing 320 is placed in the third docking site (i.e., third position), a third mode of operation is selected and the keyboard 370 is rendered inoperable to provide further power savings, which can increase the battery life of the folio keyboard system 100.

In certain embodiments, a key frame (not shown) is disposed below the keyboard matrix 370. A series of relay switches (e.g., reed relays) can be disposed on a key frame below each of the first 360, second 362, and third 364 docking sites. In some cases, magnets can be disposed inside the placement tabs 330. As the magnetized placement tabs 330 are placed in one of the first, second, or third docking sites, the magnetic field created by the placement tabs 330 can cause the relay switches under the respective docking site to actuate. The actuated relay closes a circuit that causes the processor 210 to place the system 300 in the appropriate mode of operation based on the selected docking site. This process is further discussed below with respect to FIG. 5. It should be noted that any suitable sensor may be used to automatically (or through manual assistance) detect the position of the tablet housing including other types of relays, optical sensors, wireless sensors, mechanical switches, buttons, or other sensing means that would be appreciated by one of ordinary skill in the art with the benefit of this disclosure.

The battery housing 340 can be configured to house a power supply for the keyboard system 300. In some cases, battery housing 340 is configured to receive a plurality of cell-type rechargeable batteries (e.g., AA, AAA, button type, etc.). It should be noted that any suitable power supply (e.g., batteries, AC adaptors, USB cables, photo-voltaic cells, etc.) can be used to power the keyboard system 300. For example, some embodiments may only use solar power (e.g., photovoltaic cells). Other embodiments may only utilize batteries (e.g., rechargeable). Some embodiments may use a combination of power sources (e.g., solar and rechargeable batteries). Any suitable power source of combination of power sources can be used (e.g., solar and USB, rechargeable batteries and USB, etc.). It should be noted that solar panels may be configured in any desired location on the folio 310. In certain cases, the solar panel can be positioned on the back side of the folio (not shown). In other case, a solar panel may be configured in the interior portion of the folio 310 such that it could collect light while in the open position. Alternatively, there may be solar panels disposed on multiple locations on the folio 310 that may solely provide power to the folio 310 or in conjunction with other power supplies (e.g., rechargeable batteries).

In some embodiments, the tablet housing 320 can be configured to receive and secure other types of display devices. For example, in certain embodiments of the invention the housing may receive and secure a tablet computer, a touch screen, a smart phone, a portable gaming device, a personal digital assistant, or other computerized device with a display.

In further embodiments, the tablet housing 320 can be made up of a variety of materials and configurations. The tablet housing 320 shown in FIG. 3 can be composed of any type of plastic, rubber, metal, or other suitable retaining device. In some cases, the tablet housing 320 can be a wrap-around style (as shown in FIG. 3) or in may be discontinuous (e.g., corner support). Certain embodiments may include other methods of securing the display device including retaining clips disposed on the sides or corners, sleeves, straps, clamps, or any suitable means of holding and manipulating the display device as described herein. In some cases, the housing 320 may be configured to support other electronic devices including, but not limited to, PDA's, smart phones, portable gaming devices, and the like.

In a closed position, the protective folio 310 functions as a convenient carrying case for a tablet computer. When opened, the protective folio can automatically turn on the display device from a sleep state to a wake state, for example, via magnetic coupling. In some cases, the folio 310 is made of a soft material with a pliable tablet housing 320 configured to wrap around the display device (e.g., tablet computer). Other embodiments can use different materials. For example, the folio may be made of leather, vinyl, fabric, or other suitable material. In some embodiments, the folio may utilize and rely on the strength and rigidity of the tablet computer to hold it in the various positions and configurations described herein, thereby allowing softer and lighter materials for the folio 310 and housing 320. In other embodiments, the folio 310 may be made of heavier materials to provide additional strength and rigidity to the various configurations described herein.

Figure 4A:
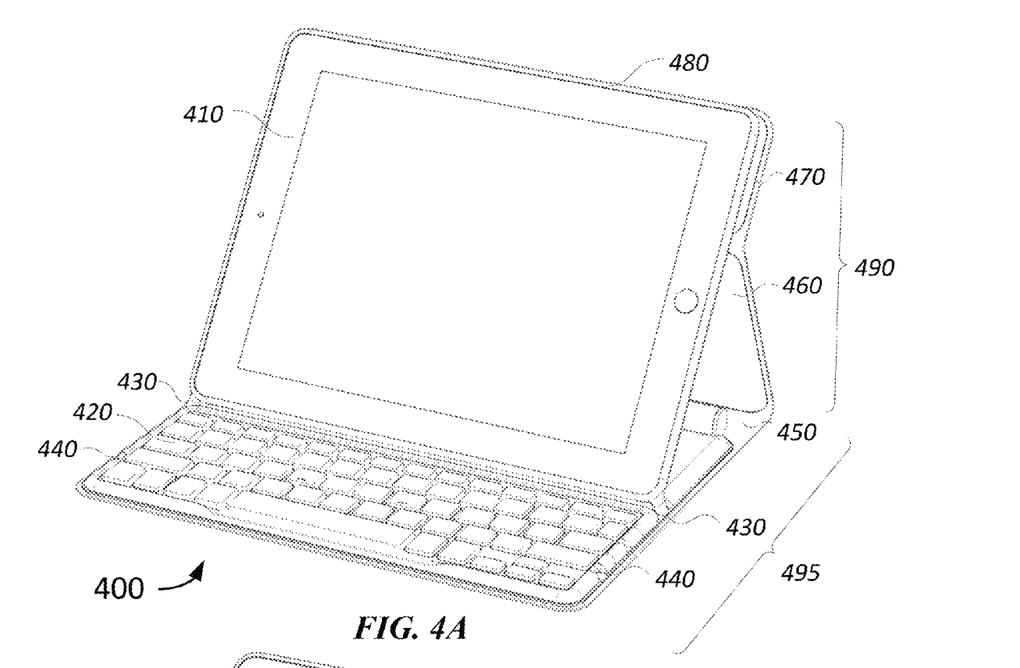
FIG. 4A illustrates the folio keyboard system in a first mode of operation, according to an embodiment of the present invention.

FIG. 4A illustrates the folio keyboard system 400 in a first mode of operation, according to an embodiment of the present invention. The folio keyboard 100 depicts the tablet computer 410 configured in an upright position (i.e., a first mode of operation) above the top row of the keyboard 420 with rear held support provided by a portion of the folio 470 itself. The folio keyboard system 400 includes a folio 450 with a front cover 490 and back cover 495. The front cover 490 of the folio 450 includes a first section 470 and a second section 460. The first section 470 is hingeably connected to the second section 460 (i.e., shares a hinged border). The second section 460 is further hingeably connected to the back cover 495 (i.e., shares a hinged border). A tablet housing is coupled to the first section 470 and includes a tablet computer 410 housed and secured therein. The back cover 495 includes the keyboard 420 disposed thereon and several docking sites 430 and 440. In some cases, the docking sites can also be referred to as receiving sites.

Referring to FIG. 4A, the tablet computer 410 is held in an upright position in a first position corresponding to the receiving sites 430 and a first mode of operation. The first section 470 and second section 460 of front cover 490 can be configured to provide a support structure for the tablet computer 410. In some cases, the keyboard 420 is fully functional in the first mode of operation, where each key is accessible by a user and configured to provide alphanumeric input data to the tablet computer 410. As shown in FIG. 4A, the tablet computer 410 is arranged at a preferred viewing angle of approximately 60 degrees measured from the surface to the back of the tablet computer 410, or 120 degrees from the keyboard to a plane formed by the tablet housing 480. Other embodiments can be configured for different viewing angles when configured in the first position.

Figure 4B:
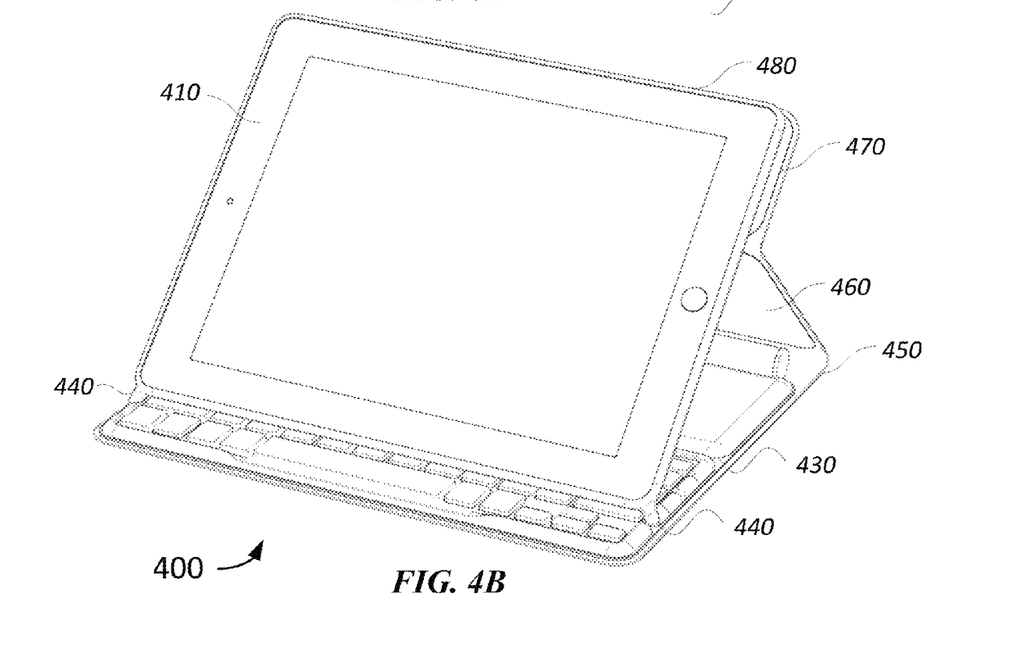
FIG. 4B illustrates the folio keyboard system in a second mode of operation, according to an embodiment of the present invention.

FIG. 4B illustrates the folio keyboard system 400 in a second mode of operation, according to an embodiment of the present invention. The tablet computer 410 is held in an upright position in a second position corresponding to the receiving sites 440 and a second mode of operation. The first section 470 and second section 460 of front cover 490 can be configured to provide a support structure for the tablet computer 410, as shown in FIG. 4B. In some cases, the keyboard 420 is partially operational in the second mode of operation, where the first row of keys are accessible by a user and configured to provide media control capabilities (e.g., volume control, play/pause, record, fast forward, rewind, next, previous, mute, play picture slideshow, show/hide virtual keyboard, and the like) while the remaining keys below and/or behind the tablet computer 410 are rendered inoperable to conserve power and improve the battery life of the system 400. As shown in FIG. 4B, the tablet computer 410 is arranged at a preferred viewing angle of approximately 36 degrees measured from the surface to the back of the tablet computer 410, or 144 degrees measured from the keyboard to a plane formed by the tablet housing 480. Other embodiments can be configured for different viewing angles when configured in the second position.

Figure 5:
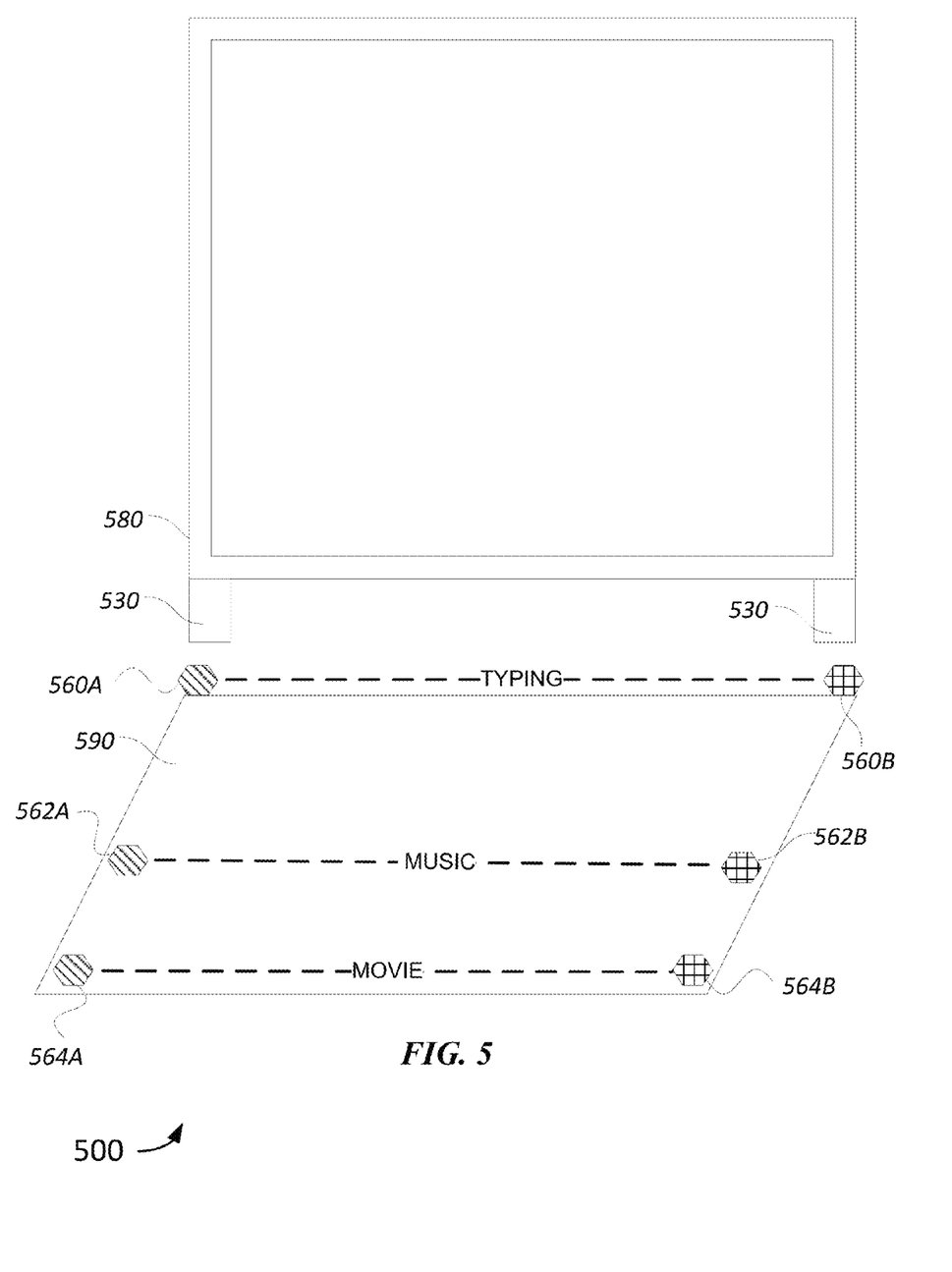
FIG. 5 illustrates a simplified diagram of the keyboard mode selection system, according to an embodiment of the invention.

FIG. 5 illustrates a simplified diagram of the keyboard mode selection system 500, according to an embodiment of the invention. The mode selection system 500 includes a tablet frame 580, placement tabs 530, key frame 590, receiving sites 560 A/B, receiving sites 562 A/B, and receiving sites 564 A/B. The placement tabs 530 can each include a magnet disposed therein. According to certain embodiments, the pair of receiving sites 560 A/B correspond to the first mode of operation (e.g., "typing mode"), the pair of receiving sites 562 A/B correspond to a second mode of operation (e.g., "music mode"), and the pair of receiving sites 564 A/B correspond to a third mode of operation (e.g., "movie mode").

As previously described, the reed relays are configured to detect a magnetic field created by the magnet in the placement tabs 530. The magnetic field causes the reed relay to close, which in turn can cause the processor to select the current mode of operation of the folio keyboard system 300. For example, if the tablet housing 580 is positioned at receiving sites 560A/B, the magnetic field created by placement tabs 530 cause the reed relay at receiving sites 560 to close and communicate with the processor 210 to indicate that the keyboard is in a first mode of operation (e.g., the "typing" position). In certain cases, the key frame 590 includes reed relays on at least one of each pair of receiving sites 560, 562, 564. For example, a reed relay may be configured on receiving sites 560B, 562B, and 564B. The key frame 590 can further include a magnet on at least one of each pair of receiving sites 560, 562, 564. For example, a magnet may be configured at receiving sites 560A, 562A, and 564A. Including a magnet at each receiving site 560A, 562A, and 564A, can help align the tablet housing 580 with the keyboard by magnetically "snapping" the placement tabs 530 into position on the key frame 590. It should be noted that other types of relays or means of selection can be utilized in the mode selection system 500 as required. For example, each receiving site may include alternative structures to mechanically, optically, or wirelessly detect the presence of the placement tabs or tablet housing at a particular operating position (i.e., mode of operation). The system 500 may optionally determine the location of the tablet housing 580 with respect to the key frame 590 by determining their relative distance from each other with respect to one or more reference points (e.g., optically, wirelessly, etc.). Additional modes and means of detection would be known and appreciated by one of ordinary skill in the art.

Certain embodiments of the invention can include receiving sites with depressions, raised platforms, slots, grooves, or other means to hold or secure the housing to a given position. In some cases, the receiving sites can be configured to receive the placement tabs 530 (i.e., protruding stub) from the housing. In other cases, the housing 580 may not have any obvious or visible protrusions. For example, the housing 580 may include internal switch mechanisms. The housing 580 can be supported by receiving portions or by other means. For example, the housing 580 may be held in a series of slots, with detectors placed within or in proximity to the slots.

According to certain embodiments, when the placement tabs 530 are positioned at the "typing" location (i.e., first location or position), as shown in FIG. 4A, the keyboard is arranged in an upright position of approximately 60 degrees (i.e., 120 degrees from keyboard to plane of tablet housing) and configured to operate the keyboard in a first mode of operation. In some cases, the keyboard is fully functional and can provide wireless alphanumeric input data to the tablet. In such cases, the "typing" location corresponds to receiving sites 560A and 560B.

In some aspects, when the placement tabs 530 are positioned at what may be considered as the "music" location (i.e., second location or position), as shown in FIG. 4B, the keyboard is arranged in an upright position of approximately 35 degrees (i.e., 145 degrees from keyboard to plane of tablet housing) and configured to operate the keyboard in a second mode of operation. In the second mode of operation, the keyboard is configured to provide various media control capabilities and power saving features. For example, the bottom-most row of keys on the keyboard (i.e., the "A" row) are operational and configured to provide wireless media control functions to the tablet computer (e.g., volume control, play/pause, record, fast forward, rewind, next, previous, mute, play picture slideshow, show/hide virtual keyboard, and the like). The remaining keys above the bottom-most row may be rendered inoperable, which may help to conserve power and improve the battery life of the system 200 or could help reduce inadvertent inputs. For example, a user may accidentally press a covered key, or the tablet housing may rest on a number of covered keys, which could result in a stuck key that may drain power or override other key commands, etc.

In some embodiments, when the placement tabs 530 are positioned at what may be considered the "movie" location (i.e., third location or position), the keyboard is arranged in an upright position of approximately 25 degrees (i.e., 155 degrees from keyboard to plane of tablet housing) and configured to operate the keyboard in a third mode of operation. In the third mode of operation, some or all of the buttons on the keyboard may be rendered inoperable. In some embodiments, removing the tablet housing 580 from either the first or second position may turn off the keyboard, or put it into a lower power mode, similar to the third mode of operation. It should be noted that certain embodiments may only utilize two positions and/or two modes of operation. For example, some embodiments may include a typing mode (i.e., first mode) and a music mode (i.e., second mode). Furthermore, the functionality described herein can be supplemented or altered as required. For instance, the "music" mode can be configured to assign any functionality to the first row of keys (e.g., document editing tools, etc.). Further still, different receiving site locations may be used. For example, a particular receiving site location may be configured to provide two user accessible rows of keys with a particular assigned functionality. Other configurations may be implemented as required by the given application.

Figure 6:
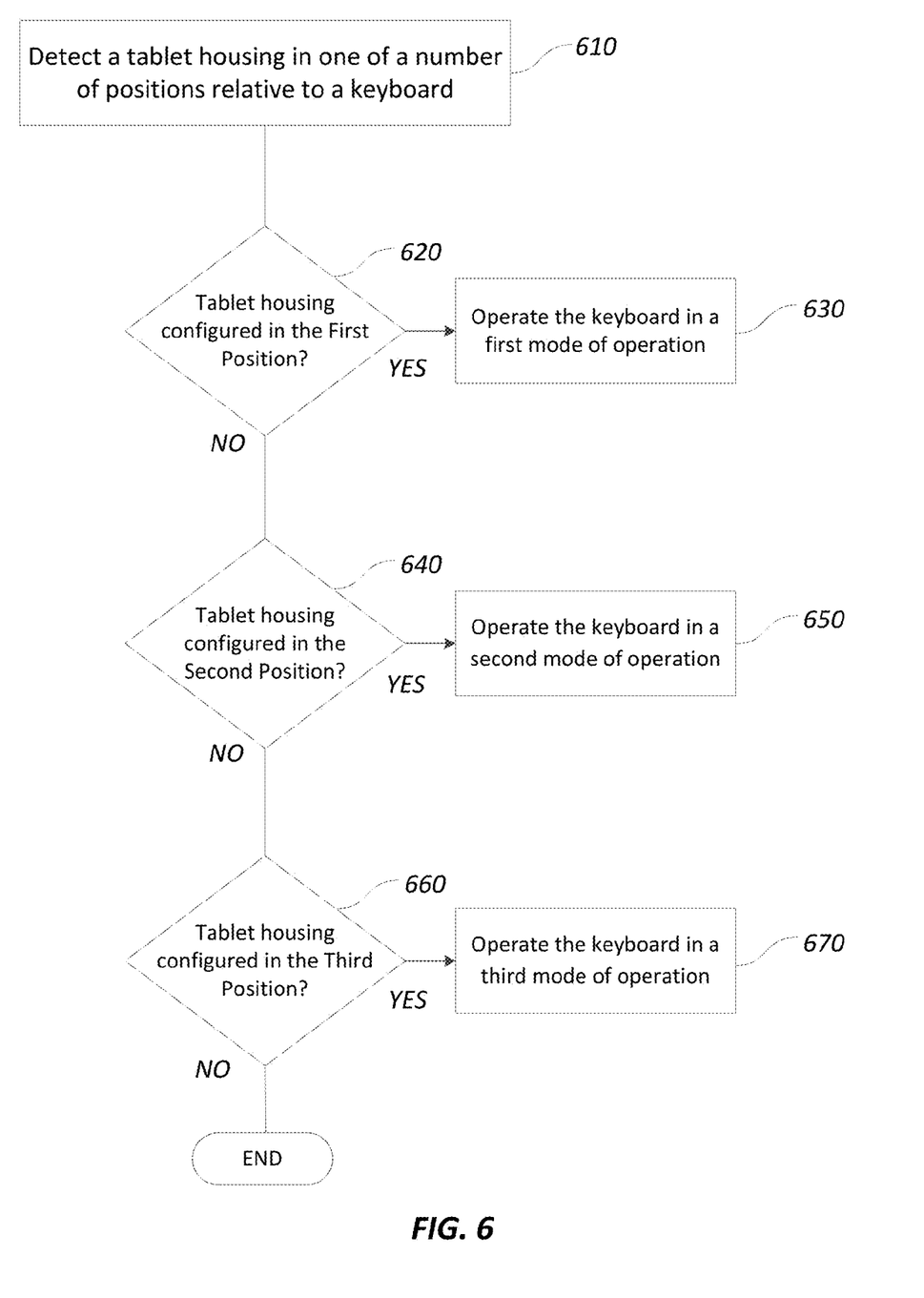
FIG. 6 depicts a simplified flow diagram illustrating aspects of a method of selecting a mode of operation on a folio keyboard for a tablet computer, according to certain embodiments of the invention.

FIG. 6 depicts a simplified flow diagram illustrating aspects of a method 600 of selecting a mode of operation on a folio keyboard for a tablet computer, according to certain embodiments of the invention. The method 600 is performed by processing logic that may comprise hardware (e.g., circuitry, dedicate logic, etc.), software (which as is run on a general purpose computing system or a dedicated machine), firmware (embedded software, or any combination thereof. In one embodiment, the method 600 is performed by the processor 210.

Referring to FIG. 6, the method 600 begins with detecting a tablet housing in one or a number of positions relative to a keyboard (610). In some embodiments, there can be a number of positions where each position can correspond to a particular mode of operation for the keyboard. The tablet housing can be detected by receiving sites. In some cases, a portion of the tablet housing includes a magnet. The receiving sites can include a relay (e.g., reed relay) configured to actuate (i.e., close a circuit) in response to being exposed to a magnetic field generated by the magnet in the tablet housing. The closed circuit can be figured to identify when the tablet housing is configured in a given position on the keyboard.

At 620, if the tablet housing is configured in the first position, the keyboard operates in a first mode of operation (630). According to some embodiments, the first position is located just above to top row of the keyboard (or key frame) and the keyboard is arranged in an upright position of approximately 60 degrees relative to the back of the tablet computer. The keyboard can be fully functional and each key may be configured to wirelessly provide alphanumeric input data to the tablet computer.

At 640, if the tablet housing is configured in the second position, the keyboard operates in a second mode of operation (650). According to some embodiments, the second position is located just above the first row of keys on the keyboard (or key frame). The keyboard may be arranged in an upright position of approximately 35 degrees relative to the back of the tablet computer. The keyboard can be configured to operate in a partially operational state, where the first row of keys are configured to provide media control functions (e.g., play, pause, etc.) and the rest of the keyboard keys are rendered inoperable to conserve power.

At 660, if the tablet housing is configured in the third position, the keyboard operates in a third mode of operation (670). According to some embodiments, the third position is located just below the first row of keys on the keyboard (or key frame). The keyboard may be arranged in an upright position of approximately 25 degrees, relative to the back of the tablet computer. All, or a portion of the keys of the keyboard can be rendered inoperable to provide further power savings, which can increase the battery life of the folio keyboard system 100.

It should be appreciated that the specific steps illustrated in FIG. 6 provide a particular method of selecting a mode of operation on a folio keyboard for a tablet computer, according to an embodiment of the present invention. Other sequences of steps may also be performed according to alternative embodiments. In certain embodiments, the method 600 may perform the individual steps in a different order, at the same time, or any other sequence for a particular application. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

It should be noted that any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. To illustrate, some embodiments of the invention may include a virtual keyboard displayed on a display device (e.g., tablet computer, personal digital assistant, touch screen, smart phone, etc.) where various keys and functions can be altered based on the position of a housing. For example, adjusting the tablet housing in the second position (as described above with respect to FIG. 4B) may assign media control functions to the bottom row of keys in the virtual keyboard display on the tablet computer or other display device.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. An input device comprising:
   a frame;
   a plurality of buttons disposed in the frame;
   a processor disposed in the frame and configured to operate the input device in one of a plurality of modes of operation including:
      a first mode of operation, wherein the plurality of buttons are programmed by the processor to have a first key mapping; and
      a second mode of operation, wherein the plurality of buttons are programmed by the processor to have a second key mapping; and
   a housing coupled to the frame and configured to receive and secure a display device,
   wherein the housing is configurable in a plurality of upright positions relative to the plurality of buttons, the plurality of positions including:
      a first position wherein a bottom edge of the housing is substantially aligned with and in proximity to a to edge of the plurality of buttons; and
      a second position wherein the bottom edge of the housing is substantially aligned with and in proximity to a middle portion of the plurality of buttons,
   wherein the processor operates the input device in the first mode of operation when the housing is configured in the first position, and
   wherein the processor operates the input device in the second mode of operation when the housing is configured in the second position.

2. The input device of claim 1 further comprising:
   one or more sensors coupled to the processor and configured to detect the position of the plurality of positions of the housing, wherein the plurality of buttons operates in one of the plurality of modes of operation based, at least in part, on which of the one or more sensors detects the housing.

3. The input device of claim 2 wherein the housing further comprises a magnet disposed therein, and wherein the one or more sensors are relays configured to actuate when in proximity to a magnetic field created by the magnet.

4. The input device of claim 1 wherein the plurality of buttons comprises a first section of buttons and a second section of buttons, and wherein the plurality of modes of operation includes at least one of:
   a first mode of operation, wherein each button of the plurality of buttons is operable to generate data in response to being pressed; and
   a second mode of operation, wherein each button of the first section of buttons is operable to generate data in response to being pressed, and wherein the second section of buttons is inoperable.

5. The input device of claim 4 wherein the plurality of modes of operation further includes a third mode of operation, wherein the first and second sections of buttons are inoperable.

6. The input device of claim 4 wherein the each button of the plurality of buttons, while operating in the first mode of operation, is operable to generate alphanumeric data.

7. The input device of claim 4 wherein one or more buttons of the first section of buttons, while operating in the second mode of operation, are operable to generate a media control command.

8. The input device of claim 1 wherein the plurality of positions further includes a fourth position, wherein the top edge of the housing is in proximity to the bottom edge of the the plurality of buttons.

9. The input device of claim 8 wherein each position of the plurality of positions is held in an orientation comprising an angle between a surface of the plurality of buttons and a plane formed by the housing, such that:
   the housing held in the first position is oriented at a first angle relative to the plurality of buttons;
   the housing held in the second position is oriented at a second angle relative to the plurality of buttons, the second angle greater than the first angle;
   the housing held in a third-position is oriented at a third angle relative to the plurality of buttons, the third angle greater than the second angle; and
   the housing held in the fourth position is substantially parallel to the plane formed by the housing.

10. The input device of claim 1 further comprising a power supply comprising at least one of a solar panel, batteries, rechargeable batteries configured to be recharged by the solar panel, or a universal serial bus (USB).

11. The input device of claim 1 wherein the input device is a folio configured to perform at least one of waking the display device from a sleep mode when the folio is opened and putting the display device in the sleep mode when the folio is closed.

12. The input device of claim 1 wherein the plurality of keys is a keyboard operable to be wirelessly coupled to the display device via at least one of a Bluetooth, infra-red (IR), optical, or Wi-Fi connection.

13. An input device comprising:
a frame;
a plurality of buttons disposed in the frame;
a processor disposed in the frame and configured to operate the input device in one of a plurality of modes of operation including:
 a first mode of operation, wherein the plurality of buttons are programmed by the processor to have a first key mapping; and
 a second mode of operation, wherein the plurality of buttons are programmed by the processor to have a second key mapping; and
a housing coupled to the frame and configured to receive and secure a display device,
wherein the housing is configurable in a plurality of upright positions relative to the plurality of buttons, the plurality of positions including:
 a first position wherein a bottom edge of the housing is substantially aligned with and in proximity to a to edge of the plurality of buttons; and
 a second position wherein the bottom edge of the housing is substantially aligned with and in proximity to a bottom edge of the plurality of buttons,
wherein the processor operates the input device in the first mode of operation when the housing is configured in the first position, and
wherein the processor operates the input device in the second mode of operation when the housing is configured in the second position.

14. A method of operating an input device, the method comprising:
receiving a housing in a position of a plurality of positions relative to a key frame disposed in the input device, the housing configured to receive and secure a display device, the key frame including a plurality of buttons disposed thereon,
wherein the plurality of positions includes:
 a first position wherein the housing is configured on a top portion of the keyframe;
 a second position wherein the housing is configured on a middle portion of the keyframe; and
 a third position wherein the housing is configured at a bottom portion of the keyframe;

selecting, by a processor disposed in the housing, a mode of operation for the input device based on whether the housing is positioned in the first position, second position, or third position; and
operating the input device in the selected mode of operation,
 wherein the processor programs the plurality of buttons according to a first key mapping in the first position,
 wherein the processor programs the plurality of buttons according to a second key mapping in the second position, and
 wherein the processor programs the plurality of buttons according to a third key mapping in the third position.

15. The method of claim 14 further comprising detecting in which position of the plurality of positions the housing is held.

16. The method of claim 14, wherein the detecting is performed by a plurality of sensors disposed on the key frame.

17. The method of claim 16 wherein the plurality of sensors are relays, the method further comprising detecting an actuation of the relay, notifying the processor that the housing is in a position corresponding to the position the housing is held.

18. The method of claim 17 wherein a portion of the housing comprises a magnet, wherein the actuation of the relay is caused by a magnetic field of the magnet.

19. The method of claim 14 wherein selecting a mode of operation further comprises:
in response to receiving the housing in the first position, selecting a first mode of operation for the plurality of buttons wherein each button of the plurality of buttons is operable to generate data in response to being pressed.

20. The method of claim 14 wherein selecting a mode of operation further comprises:
in response to receiving the housing in the second position, selecting a second mode of operation wherein a first portion of keys of the plurality of keys is configured to generate data in response to being pressed, and a second portion of keys is inoperable.

21. The method of claim 20 further comprising generating a media control command for at least one key of the first portion of keys in response to the at least one key being pressed.

22. The method of claim 14 wherein selecting a mode of operation further comprises:
in response to receiving the housing in the third position, selecting a third mode of operation wherein the first portion and second portion of keys are inoperable.

* * * * *